(12) United States Patent
Larsson

(10) Patent No.: US 12,502,678 B2
(45) Date of Patent: Dec. 23, 2025

(54) CENTRIFUGAL SEPARATOR INCLUDING A PLURALITY OF TEMPERATURE SENSORS PROVIDED AT OUTLET CHANNELS, AND A METHOD OF OPERATING A CENTRIFUGAL SEPARATOR

(71) Applicant: ALFA LAVAL CORPORATE AB, Lund (SE)

(72) Inventor: Per-Gustaf Larsson, Huddinge (SE)

(73) Assignee: ALFA LAVAL CORPORATE AB, Lund (SE)

( * ) Notice: Subject to any disclaimer, the term of this patent is extended or adjusted under 35 U.S.C. 154(b) by 644 days.

(21) Appl. No.: 17/914,479

(22) PCT Filed: Mar. 31, 2021

(86) PCT No.: PCT/EP2021/058440
§ 371 (c)(1),
(2) Date: Sep. 26, 2022

(87) PCT Pub. No.: WO2021/204623
PCT Pub. Date: Oct. 14, 2021

(65) Prior Publication Data
US 2023/0120257 A1    Apr. 20, 2023

(30) Foreign Application Priority Data
Apr. 8, 2020   (EP) .................................... 20168708

(51) Int. Cl.
*B04B 1/08* (2006.01)
*B04B 11/02* (2006.01)
*B04B 13/00* (2006.01)

(52) U.S. Cl.
CPC ................ *B04B 1/08* (2013.01); *B04B 11/02* (2013.01); *B04B 13/00* (2013.01)

(58) Field of Classification Search
CPC ........... B04B 1/08; B04B 11/02; B04B 13/00; B04B 1/14; B04B 1/12; B04B 1/10;
(Continued)

(56) References Cited

U.S. PATENT DOCUMENTS

| 3,986,663 A | 10/1976 | Jonsson et al. |
| 4,525,155 A | 6/1985 | Nilsson |

(Continued)

FOREIGN PATENT DOCUMENTS

| CN | 102712002 A | 10/2012 |
| CN | 107530716 A | 1/2018 |

(Continued)

OTHER PUBLICATIONS

Japanese Notice of Allowance for Japanese Application No. 2022-561571, dated Apr. 8, 2024, with English translation.

(Continued)

*Primary Examiner* — Duane Smith
*Assistant Examiner* — Shuyi S. Liu
(74) *Attorney, Agent, or Firm* — Birch, Stewart, Kolasch & Birch, LLP

(57) ABSTRACT

A centrifugal separator and a method of operating the separator are disclosed. The separator includes a centrifuge rotor having a rotor wall enclosing an inner space containing a stack of separation disks. The rotor includes an inlet for a product, a first outlet for a light phase of the product, and a second outlet for a heavy phase of the product. The second outlet includes a plurality of outlet channels extending along an inner side of the rotor wall from an outer region towards an inner region of the inner space. Each outlet channel transports a flow of the heavy phase from the outer region. The separator includes a plurality of temperature sensors provided at a respective outlet channel. Each sensor senses a temperature in the proximity of the respective outlet (Continued)

channel and provides a signal representing the sensed temperature.

20 Claims, 4 Drawing Sheets

(58) Field of Classification Search
CPC ... B04B 5/0442; B04B 11/04; F25B 2400/02; B01D 11/0207; B01D 1/0082; B01D 5/0051; B01D 45/12; B01D 46/448; C02F 1/385; C02F 11/127; G01K 13/00; G01K 1/026; G01K 1/143; G01K 17/06; G01K 17/00
USPC .................................. 96/420; 494/1, 2, 10, 43
See application file for complete search history.

(56) References Cited

U.S. PATENT DOCUMENTS

| | | |
|---|---|---|
| 2013/0029828 A1 | 1/2013 | Häggmark et al. |
| 2019/0143343 A1 | 5/2019 | Bathelt et al. |
| 2020/0012879 A1 | 1/2020 | Wang et al. |

FOREIGN PATENT DOCUMENTS

| | | |
|---|---|---|
| EP | 0 241 128 A1 | 10/1987 |
| EP | 3 085 449 A1 | 10/2016 |
| JP | 59-199066 A | 11/1984 |
| JP | 2002-66382 A | 3/2002 |
| JP | 2002-537997 A | 11/2002 |
| JP | 2013-517939 A | 5/2013 |
| JP | 2019-516548 A | 6/2019 |
| JP | 2020-523195 A | 8/2020 |
| KR | 1984-0008597 A | 12/1984 |
| SE | 8601154 L | 9/1987 |
| WO | WO 00/53331 A1 | 9/2000 |
| WO | WO 2011/093784 A1 | 8/2011 |
| WO | WO 2017/198475 A1 | 11/2017 |
| WO | WO 2018/166276 A1 | 9/2018 |
| WO | WO 2018/228992 A1 | 12/2018 |

OTHER PUBLICATIONS

English translation of the Chinese Office Action and Search Report for Chinese Application No. 202180026387.6, dated May 17, 2024.
Japanese Office Action for Japanese Application No. 2022-561571, dated Dec. 11, 2023.
International Search Report for PCT/EP2021/058440 mailed on Jun. 22, 2021.
Written Opinion of the International Searching Authority for PCT/EP2021/058440 mailed on Jun. 22, 2021.

CENTRIFUGAL SEPARATOR INCLUDING A PLURALITY OF TEMPERATURE SENSORS PROVIDED AT OUTLET CHANNELS, AND A METHOD OF OPERATING A CENTRIFUGAL SEPARATOR

THE FIELD OF THE INVENTION

The present invention refers to a centrifugal separator according to the preamble of claim 1. The present invention also refers to a method of operating a centrifugal separator according to the preamble of claim 14.

BACKGROUND OF THE INVENTION AND PRIOR ART

A constant flow of the relatively heavy component through the outlet channels of such a centrifugal separator is considered a key factor for making the centrifugal separator work continuously and efficiently. It is important that an interface level between the relatively heavy phase and the relatively light phase is correctly positioned in the inner space of the centrifuge rotor.

If the flow through the outlet channels is too large, then the interface level will be located too far out with respect to the inlet openings of the outlet channels. This may lead to a wet relatively heavy phase, which in turn leads to product losses through the outlet channels.

If instead the flow of the relatively heavy phase through the outlet channels is too small, then the interface level will move inwards, and may then be located far in from the inlet openings of the outlet channels. This will make the relatively heavy phase too dry, which in turn could lead to a reduced flow and eventually to blockage of one or more of the outlet channels.

Blockage of one or more of the outlet channels may lead to partial, or even complete, blockage of the stack of separation disks, and thus to a loss of separation performance. To resolve a blockage of one or more outlet channels, complete discharge of the inner space of the centrifuge rotor via peripheral outlet ports is normally required, leading to loss in production time and product.

WO 2011/093784 discloses a hermetic centrifugal separator comprising a rotor including a separation chamber, an inlet channel for a mixture of components to be separated, a first outlet channel for receiving at least one separated light component, and a second outlet channel for receiving at least one separated heavy component. Recirculation means are provided for recirculating from said second outlet channel to said separation chamber part of the separated heavy component, as well as a first monitoring means monitoring density, flow rate, or combination thereof, of the heavy component flowing in said second outlet channel, and a first control means controlling recirculation flow rate in response to a control signal from said first monitoring means.

SUMMARY OF THE INVENTION

An object of the present invention is to remedy the problems discussed above, and in particular to permit detection of a reduced flow or blockage of the relatively heavy phase. Especially, it is aimed at a centrifugal separator that permits detection of a reduced flow in or blockage of individual outlet channels for the relatively heavy phase in the centrifuge rotor.

This object is achieved by the centrifugal separator initially defined, which is characterized in that the centrifugal separator comprises a plurality of temperature sensors, each temperature sensor being provided at least in the proximity of a respective one of the outlet channels and being configured to sense a temperature in the proximity of the respective outlet channel, and to provide a signal representing the sensed temperature.

This invention relies on the insight of the inventor that the temperature in and around the outlet channels of the centrifuge rotor will increase if the flow of the relatively heavy phase in the outlet channels is reduced or blocked. The temperature increase is based on air friction. Due to the rotation of the centrifuge rotor, the friction between the surrounding air and the centrifuge rotor will heat up the centrifuge rotor. As long as there is a flow of the relatively heavy phase in the outlet channels along the inner side of the rotor wall, the flow will cool down the outlet channels and the centrifuge rotor in the proximity of the outlet channels. However, when the flow through the outlet channels is reduced or even blocked, the cooling effect of the flow will decrease, and the temperature will increase. According to the invention, this increase of the temperature may be sensed by means of the temperature sensors. The signal provided by the temperature sensor or temperature sensors may thus be used as a warning to an operator or to a control system or as in input signal to any means configured to permit an increase of the flow through the outlet channel or outlet channels.

By means of the temperature sensors, it is thus possible to detect a reduced flow or blockage at an early stage within one or more of the outlet channels, permitting e.g. the control system, which may form part of a processing equipment, to take preventive counter-measures before the relatively heavy phase is too dry.

According to an embodiment of the invention, the outlet channels may extend along an inner side of an upper portion of the rotor wall from the radially outer region of the inner space towards the radially inner region of the inner space, or alternatively along an inner side of a lower portion of the rotor wall from the radially outer region of the inner space towards the radially inner region of the inner space.

According to an embodiment of the invention, each of the temperature sensors may adjoin the respective outlet channel and is located on a side of the outlet channel that is turned towards the stack of separation disks. By providing the temperature sensors on the side of the respective outlet channel turned towards the stack of separations disks, the temperature of the relatively heavy phase in the outlet channels may be sensed.

According to an embodiment of the invention, the centrifuge rotor may comprise a separate element provided in the inner space between the stack of separation disks and an upper portion of the rotor wall, wherein the outlet channels are provided between the separate element and the inner side of the upper portion of the rotor wall. The outlet channels may thus be located directly against the inner side of the rotor wall. Efficient heat transfer between the rotor wall and the outlet channels may thus be ensured.

The separate element may retain the outlet channels or may delimit or define the outlet channels.

According to an embodiment of the invention, the separate element may be a frusto-conical element provided as an upper element on the stack of separation disks, or a frusto-conical element provided inside the inner side of a lower portion of the rotor wall.

According to an embodiment of the invention, each of the outlet channels may comprise a respective groove in the separate element. The separate element may adjoin the inner side of the rotor wall, such as the upper portion or the lower portion of the rotor wall, wherein each groove may form an outlet channel together with the inner side of the rotor wall.

According to an embodiment of the invention, each of the outlet channels may be formed by a respective pipe. The pipes may adjoin the inner side of the rotor wall, such as the upper portion or the lower portion of the rotor wall, and in particular be arranged between the separate element and said inner side. For instance, the pipes may be clamped between the separate element and said inner side. The separate element may alternatively, as mentioned above, comprise grooves, wherein the pipes may be provided in the grooves.

According to an embodiment of the invention, each of the temperature sensors may be provided in a recess in the separate element. The recess may be provided in the groove, such as in a bottom surface of the groove. The temperature sensor may then be in direct contact with the relatively heavy phase or in contact with the relatively heavy phase via the pipe in order to ensure heat transfer from the relatively heavy phase to the temperature sensor. The recess may alternatively be provided in the outer surface of the separate element and may then be in contact with the pipe.

According to an embodiment of the invention, each of the temperature sensors may communicate with a processing equipment configured for receiving the signals from the temperature sensors and for evaluating the received signals. By means of the evaluated signals, the processing equipment may thus take preventive counter-measures before the relatively heavy phase is too dry.

According to an embodiment of the invention, the processing equipment may be configured to perform said evaluation by comparing the signals from the temperature sensors and to create a temperature reference value corresponding to the signal of the temperature sensor that provides the lowest sensed temperature. By using the lowest temperature as a temperature reference value, no temperature reference needs to be provided in advance.

According to an embodiment of the invention, the processing equipment may be configured to identify a signal from any one of the temperature sensors that exceeds the temperature reference value by a predetermined threshold value. Exceeding the temperature reference value by the predetermined threshold value may thus be an indication that counter-measures are required to prevent the relatively heavy phase from becoming too dry.

According to an embodiment of the invention, the processing equipment may comprise at least one control valve controlling the flow of the relatively heavy phase and/or the pressure acting on the relatively heavy phase in the centrifuge rotor in response to said signal exceeding the temperature reference value by the predetermined threshold value. The processing equipment may thus be configured to open the control valve to increase the flow of the relatively heavy phase when the signal exceeds the temperature reference value by the predetermined threshold value. The control valve may be a control valve common for all outlet channels, or each outlet channel may include a respective individual control valve permitting individual control of the flow of the relatively heavy phase in each outlet channel.

According to an embodiment of the invention, the processing equipment may comprise an internal processor unit mounted in or on the centrifuge rotor and communicating with each of the temperature sensors, wherein the internal processor unit is configured to collect the signals from the plurality of temperature sensors. The signals from the temperature sensors may be collected and stored in a suitable data package by the internal processor arranged on or in the centrifuge rotor. It may be possible also to evaluate the signals by means of the internal processor, which then may deliver a suitable control signal or suitable control signals, for instance to a control valve or a plurality of individual control valves, one for each outlet channel.

According to an embodiment of the invention, the centrifugal separator may comprise a current source supplying electrical energy to the internal processor unit.

According to an embodiment of the invention, the processing equipment may comprise an external processor unit, wherein the internal processor unit communicates with the external processor unit and is configured to transfer a package of the collected signals to the external processor unit configured for performing said evaluation of the signals. The external processor may comprise sufficient calculation power to be able to perform any suitable evaluation of the signals.

The object is also achieved by the method initially defined, which is characterized by the further steps of:
 sensing a temperature in the proximity of each of the outlet channels, and
 providing a signal for each outlet channel, that represents the sensed temperature of the respective outlet channels.

The method and the sensing of the temperature of the relatively heavy phase in the outlet channels enable an efficient and reliable detection of a reduction or blockage of the flow of the relatively heavy phase at an early stage within one or more of the outlet channels. The early detection permits e.g. a control system, which may form part of a processing equipment, to take preventive counter-measures before the relatively heavy phase is too dry.

According to the invention, the method may comprise the further step of evaluating the provided signals by:
 comparing the signals of the outlet channels,
 creating a temperature reference value corresponding to the signal representing the sensed temperature of the outlet channel that has the lowest sensed temperature, and
 thereafter identifying a signal of any one of the outlet channels that exceeds the temperature reference value by a predetermined threshold value.

The use of the lowest temperature as a temperature reference value may be advantageous since no reference has to be provided in advance. A reliable indication that the flow of the relatively heavy phase is too small may be obtained if the temperature reference value is exceeded by a predetermined threshold value.

According to the invention, the method may comprise the further step of:
 controlling the flow of the relatively heavy phase and the pressure in the inner space of the centrifuge rotor in in response to said signal exceeding the temperature reference value by the predetermined threshold value.

The controlling may be performed by controlling one or more control valves to increase or decrease the flow and/or pressure of the relatively heavy phase, and by simultaneously controlling the outlet control valve for maintaining the pressure in the inner space.

In order to increase or decrease the flow of the relatively heavy phase, the processing equipment may perform a combination of controlling the one or more control valves and controlling the outlet control valve in order to obtain a certain differential pressure in the inner space of the centrifuge rotor. The differential pressure may act on the relatively heavy phase to create a certain flow of the relatively heavy phase from the inner space through the outlet channels. This differential pressure may thus form the driving pressure on the relatively heavy phase.

BRIEF DESCRIPTION OF THE DRAWINGS

The present invention will now be explained more closely by means of a description of various embodiments and with reference to the drawings attached hereto.

DETAILED DESCRIPTION OF VARIOUS EMBODIMENTS OF THE INVENTION

Figure 1:
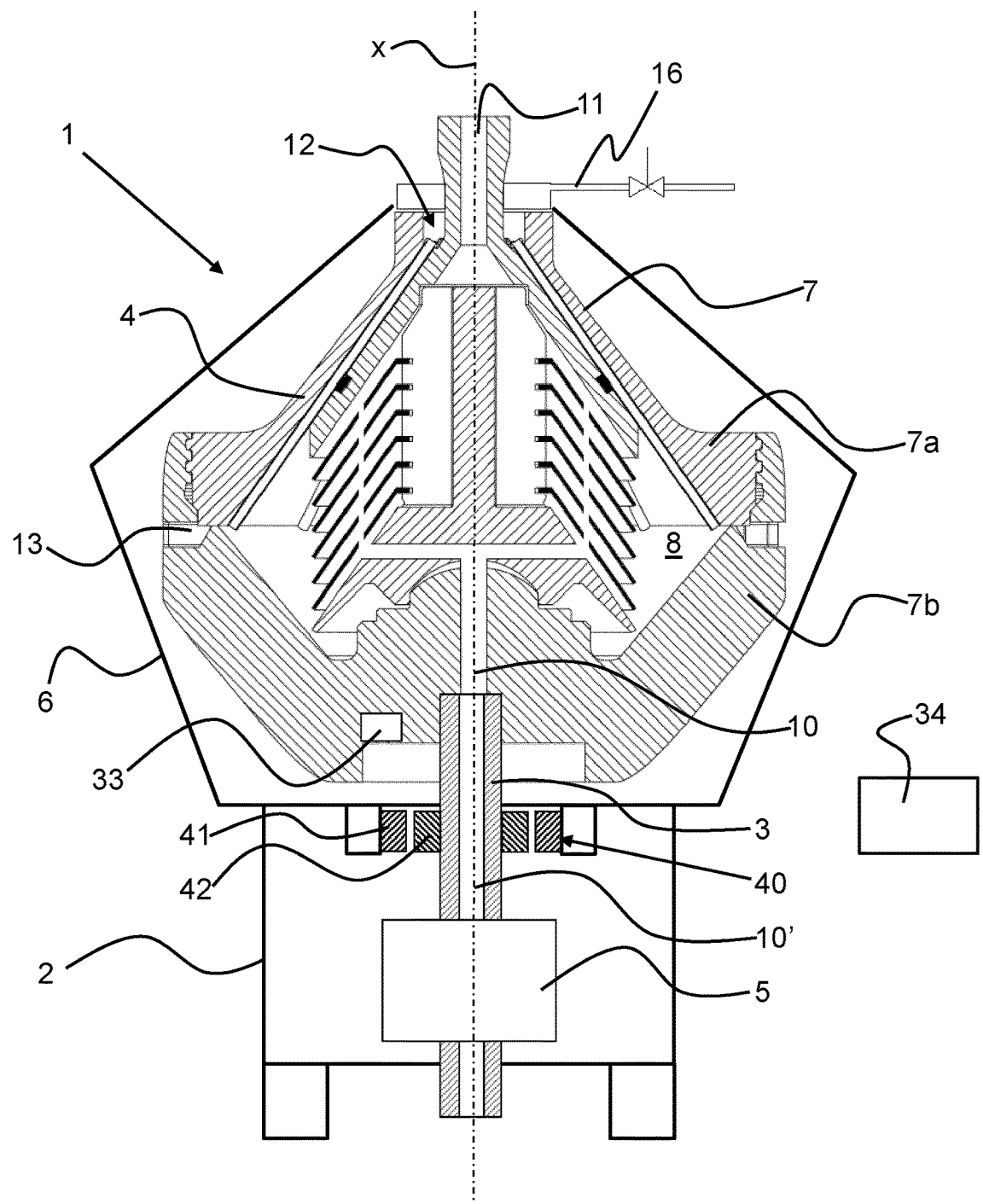
FIG. 1 discloses a sectional view of a first embodiment of a centrifugal separator according to the invention.

FIG. 1 discloses a first embodiment of a centrifugal separator 1 for separating a product into a relatively heavy phase and a relatively light phase.

According to the first embodiment, the centrifugal separator 1 comprises a stationary frame 2, a spindle 3 supported by the stationary frame 2, and a centrifuge rotor 4 mounted on the spindle 3. The spindle 3 and the centrifuge rotor 4 are rotatable in relation to the stationary frame 2 around an axis x of rotation by means of a drive unit 5. The axis x of rotation may extend vertically during operation of the centrifugal separator 1. The stationary frame 2 may comprise a stationary casing 6 surrounding and enclosing the centrifuge rotor 4.

Figure 2:
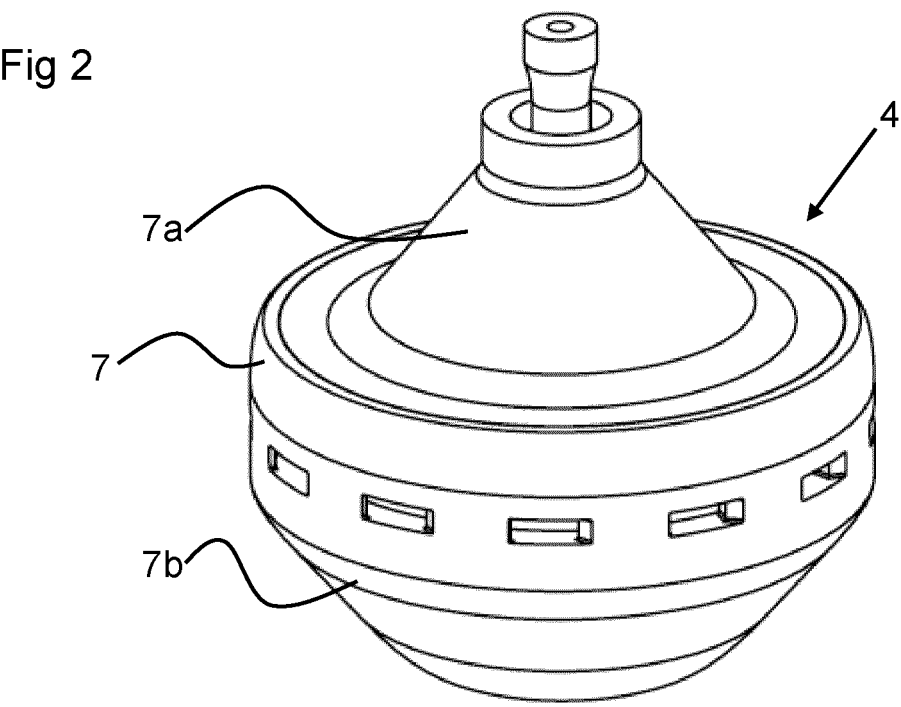
FIG. 2 discloses a perspective view of a centrifuge rotor of the centrifugal separator in FIG. 1.
Figure 3:
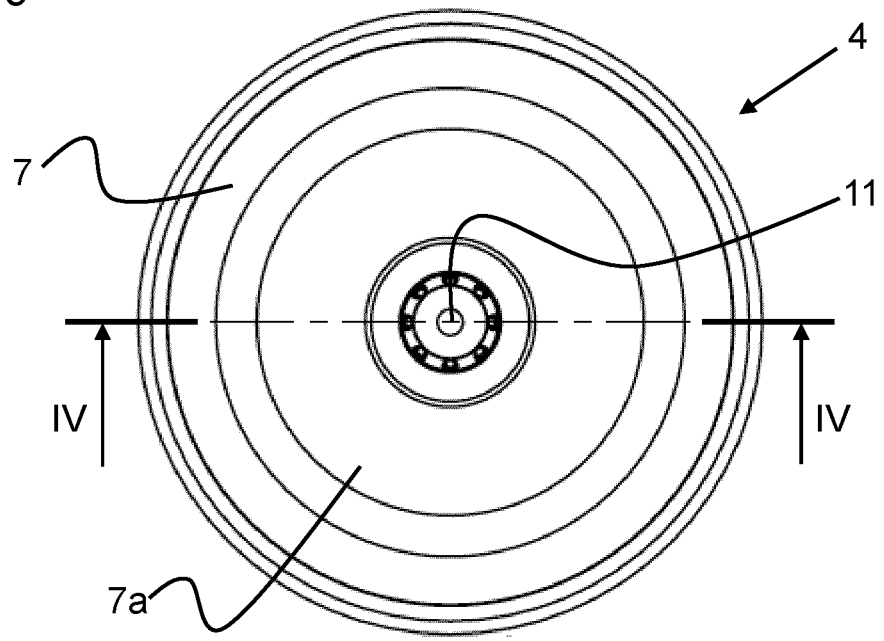
FIG. 3 discloses a view from above of the centrifuge rotor.
Figure 4:
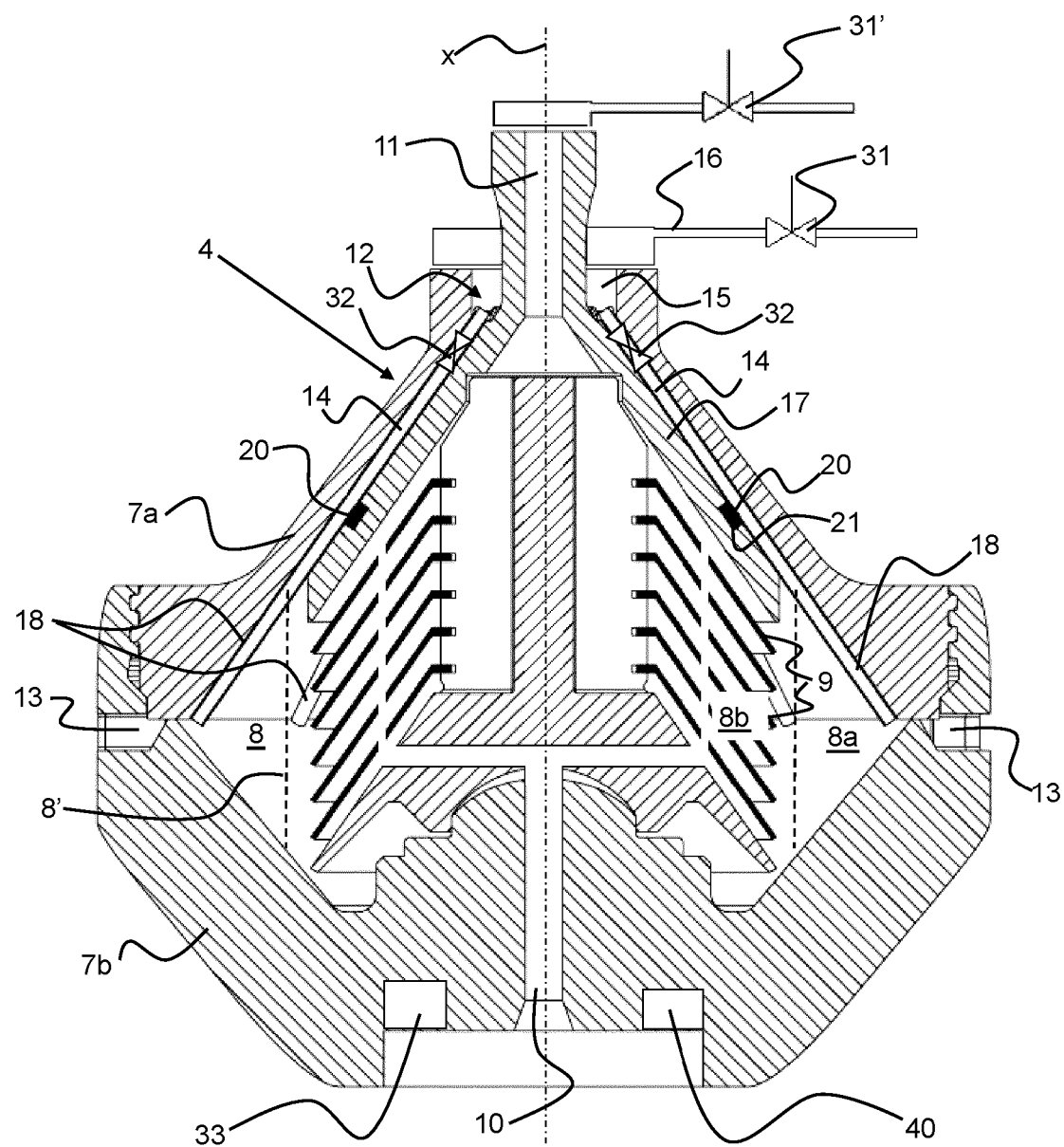
FIG. 4 discloses sectional view along the line IV-IV in FIG. 3.

The centrifuge rotor 4, which is described more closely with reference to FIGS. 2-4, comprises a rotor wall 7 enclosing an inner space 8, and a stack of frusto-conical separation disks 9 provided in the inner space 8. According to the first embodiment, the rotor wall 7 comprises an upper portion 7a and a lower portion 7b.

The inner space 8 comprises a radially outer region 8a and a radially inner region 8b. During use of the centrifugal separator 1, an interface level 8' between separated light and heavy phases in the inner space 8 may be seen as border between the outer and inner regions 8a, 8b, see FIG. 4.

According to the first embodiment, the upper portion 7a and the lower portion 7b of the rotor wall 7 adjoin each other at the radially outer region 8a of the inner space 8.

The centrifuge rotor 4 also comprises an inlet 10 for introducing the product to the inner space 8, a first outlet 11 for discharging the relatively light phase from the inner space 8, and a second outlet 12 for discharging the relatively heavy phase from the inner space 8.

In the first embodiment, the inlet 10 of the centrifuge rotor 4 extends along the axis x of rotation in line with an inlet channel 10' through the spindle 3 as is illustrated in FIG. 1.

The centrifuge rotor 4 may also comprise a plurality of peripheral outlet ports 13 that may extend through a radially outer part of the lower portion 7a of the rotor wall 7. The peripheral outlet ports 13 may be openable for intermittent discharge of sludge from the inner space 8 in a manner known in the prior art.

The second outlet 12 comprises a plurality of outlet channels 14 extending along an inner side of the rotor wall 7 from the radially outer region 8a of the inner space 8 towards the radially inner region 8b of the inner space 8. Each of the outlet channels 14 is configured to transport a flow of the relatively heavy phase from the radially outer region 8a.

The outlet channels 14 may be equidistantly distributed on the inner side of the rotor wall 7. In addition, each of the outlet channels 14 may extend in a respective plane that is parallel with the axis x of rotation.

In the first embodiment, the outlet channels 14 extend along an inner side of the upper portion 7a of the rotor wall 7, as can be seen in FIG. 4, from the radially outer region 8a and through the interface level 8'. The outlet channels 14 may extend towards or to an outlet chamber 15, which may be comprised by the second outlet 12 and the centrifuge rotor 4. The outlet chamber 15 may adjoin a stationary discharge conduit 16 that may be attached to the stationary casing 6. The stationary discharge conduit 16 may be sealed from the outlet chamber 15 in a manner known in the prior art.

The outlet chamber 15 may thus be configured to receive the relatively heavy phase from the outlet channels 14. The relatively heavy phase may then be discharged from the outlet chamber 15 and thus from the centrifuge rotor 8 via the stationary discharge conduit 16.

The centrifuge rotor 4 comprises a separate element 17 provided in the inner space 8 of the centrifuge rotor 4. In the first embodiment, the separate element 17 is provided between the stack of separation disks 9 and the upper portion 7a of the rotor wall 7. The outlet channels 14 may be provided between the separate element 17 and the inner side of the upper portion 7a of the rotor wall 7.

According to the first embodiment, the separate element 17 comprises of consists of a frusto-conical element having the same cone angle as the frusto-conical separation disks 9.

According to the first embodiment, each of the outlet channels 14 is formed by a respective pipe 18 arranged between the separate element 17 and the inner side of the upper portion 7a of the rotor wall 7. The pipes 18 may be clamped between an outer surface of the separate element 17 and the inner side of the upper portion 7a of the rotor wall 7.

Alternatively, each of the outlet channels 14 may comprise or may be formed by a respective groove in the separate element 17 and the inner side of the rotor wall 7, or the inner side of the upper portion 7a of the rotor wall 7.

According to a further alternative, each pipe 18 may be arranged in a respective groove in the separate element 17.

The centrifugal separator 1 comprises a plurality of temperature sensors 20. In the first embodiment, each temperature sensor 20 is provided in the proximity of a respective one of the outlet channels 14. Each temperature sensor 20 is configured to sense a temperature in the proximity of the respective outlet channel 14, and to provide a signal representing the sensed temperature.

According to the first embodiment, each of the temperature sensors 20 adjoins the respective outlet channel 14 and is located on a side of the outlet channel 14 that is turned towards the stack of separation disks 9 and thus away from the inner side of the upper portion 7a of the rotor wall 7.

Figure 5:
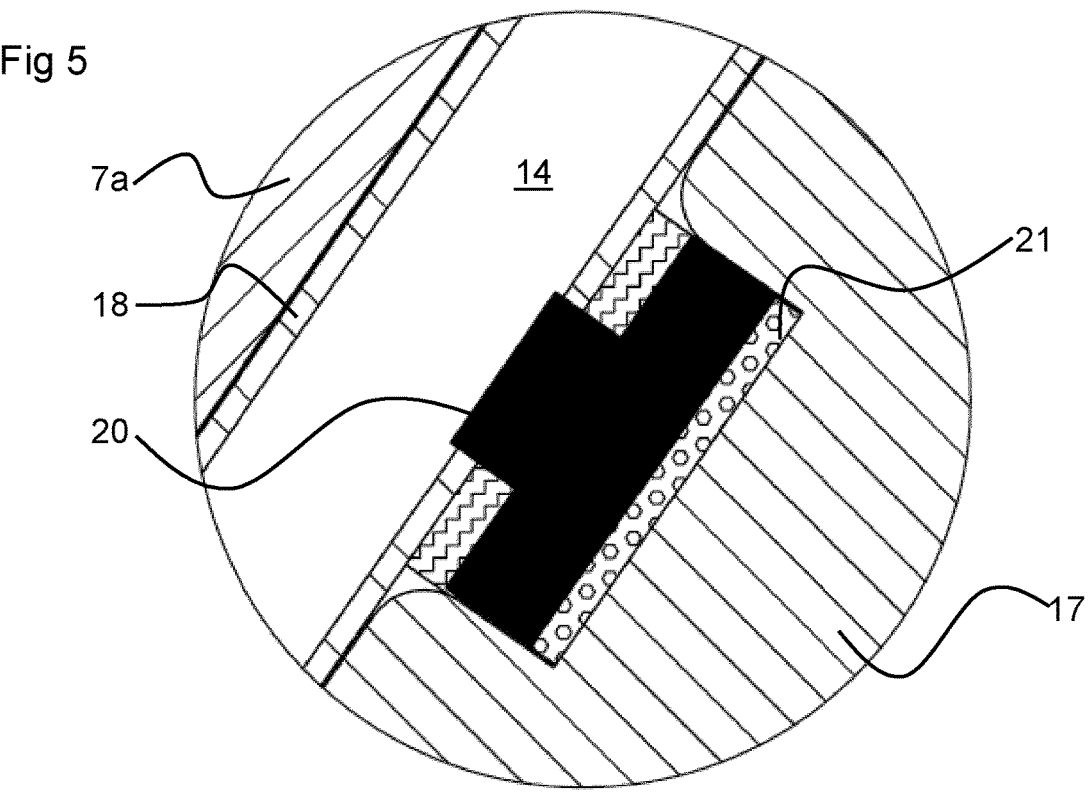
FIG. 5 discloses a temperature sensor in the centrifuge rotor.

Furthermore, each of the temperature sensors 20 may be provided in a recess 21 in the separate element 17, see FIGS. 4 and 5. FIG. 5 also illustrates that the temperature sensor 20, optionally, may penetrate the pipe 18, and thus may extend through the wall of the pipe 18. In this embodiment, the temperature sensor 20 may thus be in direct contact with the relatively heavy phase flowing through the pipe 18.

Also in the embodiment according to which each of the outlet channels 14 are comprised by a respective groove in the separate element 17, the temperature sensor 20 may be provided in a recess 21 in the separate element 17, in particular in a recess in the groove in the separate element 17. The recess 21 may extend through the bottom of the groove. Also in this case, the temperature sensor 20 may thus be in direct contact with the relatively heavy phase flowing in the outlet channel 14, i.e. in the groove.

Figure 6:
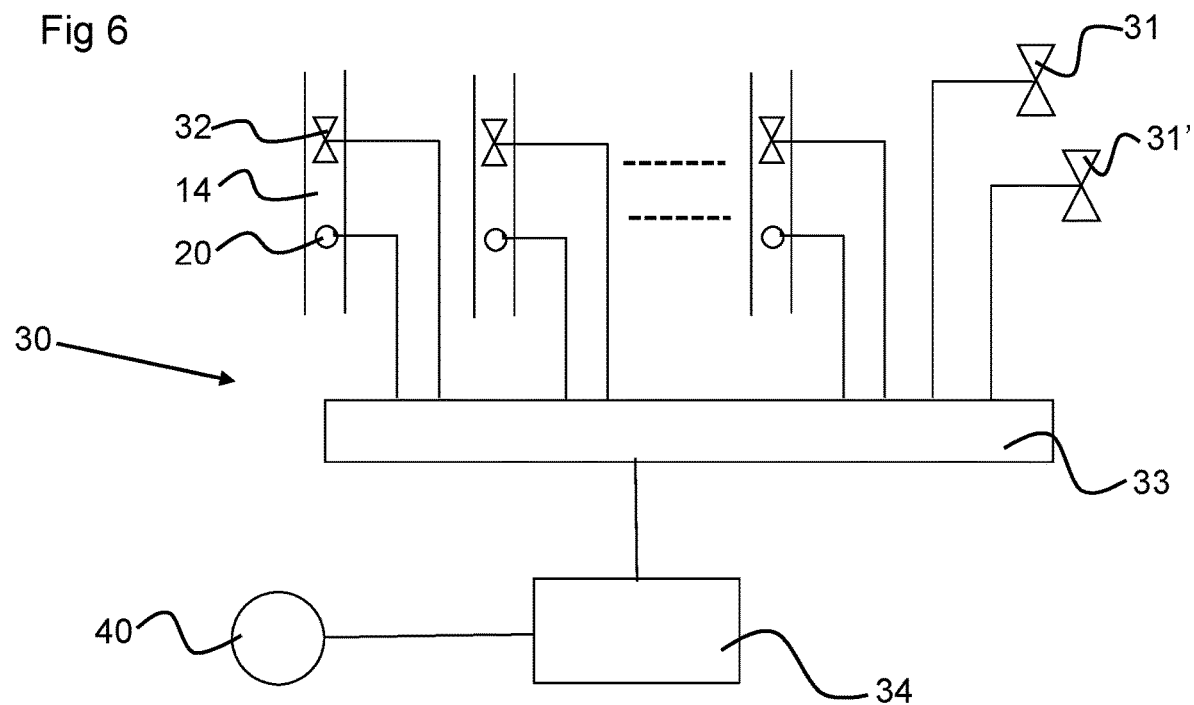
FIG. 6 discloses a schematic view of a processing equipment of the centrifugal separator.

According to the first embodiment, each of the temperature sensors 20 communicates with a processing equipment 30. The processing equipment 20 is configured for receiving the signals from the temperature sensors 20 and for evaluating the received signals, see also FIG. 6. Furthermore, the processing equipment 30 may be configured to perform the evaluation of the received signals by comparing the signals from the different temperature sensors 20 and then to create a temperature reference value corresponding to the signal of the temperature sensor 20 that provides the lowest sensed temperature. Then the processing equipment 30 may be configured to identify a signal from any one of the temperature sensors 20 that exceeds the temperature reference value by a predetermined threshold value.

If during use of the centrifugal separator 1, the signal from one of the temperature sensors 20 exceeds the temperature reference value by the predetermined threshold value, the processing equipment 30 knows that the temperature of the relatively heavy phase is too high, and thus that the flow of the relatively heavy phase in the associated outlet channel 14 is reduced or too low.

As mentioned initially, friction between the air or gas trapped within the stationary casing 6 and surrounding the centrifuge rotor 4 causes the rotor wall 7 to be warmed up. Unimpeded flow of heavy phase through the outlet channels 14 cools the rotor wall 7 locally. However, reduced or stopped flow of heavy phase in one of the outlet channels 14 will cause the temperature to rise locally in the rotor wall 7.

Alternatively, or additionally, the relatively heavy phase upstream of the temperature sensors 20, the temperature sensors 20, or the rotor wall 7 may be heated electrically to ensure a sufficient local temperature difference at the outlet channels 14 to ensure exceeding the temperature reference value by a predetermined threshold value when the flow of relatively heavy phase in the associated outlet channel 14 is reduced or too low.

This exceeding of the temperature reference value may thus be a strong indication that measures are required to prevent the relatively heavy phase from being too dry. To that end, the processing equipment 30 may according to the first embodiment comprise a control valve 31 provided on the stationary discharge conduit 16. The processing equipment 30 may thus by controlling the control valve 31 control the flow of the relatively heavy phase through the stationary outlet conduit 16 phase and/or the pressure acting on the relatively heavy phase in the centrifuge rotor in response to the signal that exceeds the temperature reference value by the predetermined threshold value.

Alternatively, or supplementary, the processing equipment 30 may comprise a plurality of individual control valves 32, wherein each one of them is provided on a respective one of the outlet channels 14 to control the flow of the relatively heavy phase individually in the outlet channels 14. The processing equipment 30 may thus by controlling the individual control valves 32 control the flow of the relatively heavy phase through the outlet channel 14 for which the associated temperature sensor 20 indicates a signal that exceeds the temperature reference value by the predetermined threshold value and/or for the other outlet channels 14.

Increasing the flow by means of an individual control valve 32 is one possibility of regulating the flow of heavy phase in the relevant outlet channels 14. Reducing the flow by means of several individual control valves 32 is a different possibility of regulating the flow of heavy phase, not only in the outlet channels 14 with reduced flow, but also causing an increase of flow in the other outlet channel/s 14.

Furthermore, the processing equipment 30 may comprise an outlet control valve 31' arranged to control the outlet flow of the relatively light phase through the first outlet 11 see FIG. 4.

By opening the outlet control valve 31', the flow of the relatively light phase through the first outlet 11 may increase, which may reduce the pressure in the inner space 8 of the centrifuge rotor 4. By closing the outlet control valve 31', the flow of the relatively light phase through the first outlet 11 may decrease, which may increase the pressure in the inner space 8 of the centrifuge rotor 4. The outlet control valve 31' may thus serve the purpose of maintaining the pressure in the inner space 8 of the centrifuge rotor 4 when manipulating the control valve 31 and/or the individual control valves 32. Consequently, in order to increase or decrease the flow of the relatively heavy phase, the processing equipment 30 may perform a combination of controlling the one or more control valves 31, 32 and controlling the outlet control valve 31' in order to obtain a certain differential pressure in the inner space 8 of the centrifuge rotor 4. The differential pressure may act on the relatively heavy phase to create a certain flow of the relatively heavy phase from the inner space 8 through the outlet channels 14. This differential pressure may thus form the driving pressure on the relatively heavy phase.

According to the first embodiment, the processing equipment 30 comprises an internal processor unit 33 and an external processing unit 34.

The internal processor unit 33 may be mounted in or on the centrifuge rotor 4, or the spindle 3, and may communicate with each of the temperature sensors 20. As indicated schematically in FIG. 6, the temperature sensors 20 and the internal processor unit 33 may communicate via an internal communication network comprising physical lines (not disclosed) or wireless communication means.

The internal processor unit 33 may be configured to collect the signals from the plurality of temperature sensors 33.

The external processor unit 34 may be mounted outside the centrifuge rotor 4 and any one of the rotating parts of the centrifugal separator 1, for instance on the frame 2 or remotely from the centrifugal separator 1. The internal processor unit 33 may communicate with the external processor unit 34 via a wireless communication network.

Herein processor unit and similar terms mean any one or various combinations of one or more of Application Specific Integrated Circuit(s) (ASIC), electronic circuit(s), central processing unit(s) (microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. Routines are executed, such as by a central processing unit, and are operable to monitor inputs from sensing devices and other networked control modules and execute control and diagnostic routines to control operation of actuators.

The internal processor unit 33 may be configured to form a package of the collected signals and to transfer the package to the external processor unit 34. The external processor unit 34 may then be configured to perform the above mentioned evaluation of the signals from the temperature sensors 20.

According to the first embodiment, the centrifugal separator 1 also comprises a current source 40 supplying electrical energy to the internal processor unit 33.

According to the first embodiment, the current source 40 comprises an electric generator, which may comprise a stationary member 41 mounted on the frame 2 and rotating member 42 mounted on the spindle 3 or the centrifuge rotor 4, schematically illustrated in FIG. 1. Examples of such a generator are disclosed in WO 2018/228992.

Alternatively, the current source 40 may comprise a rotary transformer, which may comprise a stationary member mounted on the frame 2 and a rotating member mounted on the spindle 3 or the centrifuge rotor 4. Examples of such a rotary transformer are disclosed in WO 2019/166276.

Alternatively, the current source 40 may comprise a battery mounted on or in the centrifuge rotor 4, schematically illustrated in FIG. 4.

In embodiments with electrical heating of the heavy phase, the temperature sensors 20 or the rotor wall 7, the current source suitably comprises an electric generator or a rotary transformer.

The centrifugal separator 1 may be operated as follows. The centrifuge rotor 4 is rotated around an axis x of rotation by means of the drive unit 5. A product is introduced to the inner space 8 via the channel through the spindle 3 and the inlet 10. A relatively light phase of the product is discharged from the inner space 8 via a first outlet 11 and a relatively heavy phase of the product is discharge from the radially outer region 8a of the inner space 8 via the second outlet 12, i.e. via the outlet channels 14. During the separation, the temperature in the proximity of each of the outlet channels 14 is sensed by the temperature sensor 20 on each of the outlet channels 14. The temperature sensors 20 providing a respective signal for each outlet channel 14 that represents the sensed temperature of the respective outlet channels 14 and of the relatively heavy phase flowing through the outlet channel 14. The sensing and providing of the signals may be made frequently, for instance every 10 second.

The signals from the temperature sensors 20 are then collected by the processing equipment 30. According to the first embodiment, the collected signals are included in a package by the internal processor unit 33. The package is transferred wirelessly from the internal processor unit 33 to the external processor unit 34. The signals are unpacked by the external processor unit 34 which then evaluates the signals by comparing the signals of the outlet channels 14 and creating a temperature reference value corresponding to the signal representing the sensed temperature of the outlet channel 14 that has the lowest sensed temperature. The external processor unit 34 then identifies any signal of any one of the outlet channels 14 that exceeds the temperature reference value by a predetermined threshold value. Such exceeding of the temperature reference value occurs in any one of the outlet channels, is interpreted by the external processor unit 34 as an indication of a too low flow of the relatively heavy phase through the associated outlet channel 14.

Appropriate counter-measures may then be initiated by the external processor unit 34, by controlling any one of the individual control valves 32, or by controlling the control valve 31 on the common discharge conduit 16, in particular by simultaneously controlling the outlet control valve 31' to maintain the pressure in the inner space 8.

According to an alternative embodiment, the outlet channels may extend along an inner side of the lower portion 7b of the rotor wall 7 from the radially outer region 8a of the inner space 8 towards the radially inner region 8b of the inner space 8. The outlet channels may then extend towards a bottom region of the inner space 8 from where the relatively heavy phase may be discharged from the centrifuge rotor 4.

According to an alternative embodiment, the processing equipment 30 may comprise only one processing unit for both the collection and the evaluation of the signals from the temperature sensor. The single processor unit may be provided on or in a rotary part of the centrifugal separator 1, for instance on the centrifuge rotor 4 or the spindle 3.

The present invention is not limited to the embodiments disclosed but may be varied and modified within the scope of the following claims.

The invention claimed is:

1. A centrifugal separator for separating a product into a relatively heavy phase and a relatively light phase, the centrifugal separator comprising a centrifuge rotor rotatable around an axis of rotation, wherein the centrifuge rotor comprises:
   a rotor wall enclosing an inner space;
   a stack of frusto-conical separation disks provided in the inner space;
   an inlet for introducing the product to the inner space;
   a first outlet for discharging the relatively light phase from the inner space; and
   a second outlet for discharging the relatively heavy phase from the inner space,
   wherein the second outlet comprises a plurality of outlet channels extending along an inner side of the rotor wall from a radially outer region of the inner space towards a radially inner region of the inner space, each of the plurality of outlet channels being configured to transport a flow of the relatively heavy phase from the radially outer region, and
   wherein the centrifugal separator comprises a plurality of temperature sensors, each of the plurality of temperature sensors being provided inside a respective one of the outlet channels and being configured to sense a temperature inside of the respective outlet channels, and to provide a signal representing the sensed temperature.

2. The centrifugal separator of claim 1, wherein each of the temperature sensors adjoins the respective outlet channel and is located on a side of the outlet channel that is turned towards the stack of separation disks.

3. The centrifugal separator according to claim 2, wherein the centrifuge rotor comprises a separate element provided in the inner space between the stack of separation disks and an upper portion of the rotor wall, and wherein the outlet channels are provided between the separate element and the inner side of the upper portion of the rotor wall.

4. The centrifugal separator according to claim 2, wherein each of the temperature sensors communicates with processing equipment configured for receiving the signals from the temperature sensors and for evaluating the received signals.

5. The centrifugal separator according to claim 1, wherein the centrifuge rotor further comprises a separate element provided in the inner space between the stack of separation disks and an upper portion of the rotor wall, and wherein the outlet channels are provided between the separate element and the inner side of the upper portion of the rotor wall.

6. The centrifugal separator according to claim 5, wherein each of the outlet channels comprises a respective groove in the separate element.

7. The centrifugal separator according to claim 6, wherein each of the temperature sensors is provided in a recess in the separate element.

8. The centrifugal separator according to claim 5, wherein each of the outlet channels is formed by a respective pipe.

9. The centrifugal separator according to claim 8, wherein each of the temperature sensors is provided in a recess in the separate element.

10. The centrifugal separator according to claim 5, wherein each of the temperature sensors is provided in a recess in the separate element.

11. The centrifugal separator according to claim 1, wherein each of the temperature sensors communicates with processing equipment configured for receiving the signals from the temperature sensors and for evaluating the received signals.

12. The centrifugal separator according to claim 11, wherein the processing equipment is configured to perform said evaluation by comparing the signals from the temperature sensors and to create a temperature reference value corresponding to the signal of the temperature sensor that provides a lowest sensed temperature.

13. The centrifugal separator according to claim 12, wherein the processing equipment is configured to identify a signal from any one of the temperature sensors that exceeds the temperature reference value by a predetermined threshold value.

14. The centrifugal separator according to claim 13, wherein the processing equipment comprises at least one control valve controlling the flow of the relatively heavy phase and/or a pressure acting on the relatively heavy phase in the centrifuge rotor in response to said signal exceeding the temperature reference value by the predetermined threshold value.

15. The centrifugal separator according to claim 11, wherein the processing equipment comprises an internal processor unit mounted on the centrifuge rotor and communicating with each of the temperature sensors, and wherein the internal processor unit is configured to collect the signals from the plurality of temperature sensors.

16. The centrifugal separator according to claim 15, wherein the centrifugal separator comprises a current source supplying electrical energy to the internal processor unit.

17. The centrifugal separator according to claim 15, wherein the processing equipment comprises an external processor unit and wherein the internal processor unit communicates with the external processor unit and is configured to transfer a package of the collected signals to the external processor unit configured for performing said evaluation of the signals.

18. A method of operating a centrifugal separator comprising a centrifuge rotor comprising a rotor wall enclosing an inner space, and a stack of frusto-conical separation disks provided in the inner space, the method comprising:
rotating the centrifuge rotor around an axis of rotation;
introducing a product to the inner space via an inlet;
discharging a relatively light phase of the product from the inner space via a first outlet;
discharging a relatively heavy phase of the product from the inner space via a second outlet comprising a plurality of outlet channels extending along an inner side of the rotor wall from a radially outer region of the inner space, thereby transporting a flow of the relatively heavy phase from the radially outer region through each of the outlet channels;
sensing a temperature inside of each of the outlet channels; and
providing a signal for each outlet channel, that represents the sensed temperature of the respective outlet channels.

19. The method according to claim 18, further comprising evaluating the provided signals by:
comparing the signals of the outlet channels;
creating a temperature reference value corresponding to the signal representing the sensed temperature of the outlet channel that has a lowest sensed temperature; and
thereafter identifying a signal of any one of the outlet channels that exceeds the temperature reference value by a predetermined threshold value.

20. The method according to claim 19, further comprising controlling the flow of the relatively heavy phase and a pressure in the inner space of the centrifuge rotor in response to said signal exceeding the temperature reference value by the predetermined threshold value.

* * * * *